United States Patent [19]
Fujimoto

[11] Patent Number: 6,013,971
[45] Date of Patent: Jan. 11, 2000

[54] VIBRATING GYRO AND METHOD OF MANUFACTURING THE SAME

[75] Inventor: Katsumi Fujimoto, Toyama-ken, Japan

[73] Assignee: Murata Manufacturing Co., Ltd., Japan

[21] Appl. No.: 08/908,358

[22] Filed: Aug. 7, 1997

[30] Foreign Application Priority Data

Aug. 8, 1996 [JP] Japan ..................................... 8-227681

[51] Int. Cl.⁷ .................................................. H01L 41/08
[52] U.S. Cl. ........................ 310/332; 310/353; 310/366; 310/348
[58] Field of Search .................................. 310/321, 330, 310/332, 351, 353, 366, 348; 73/505

[56] References Cited

U.S. PATENT DOCUMENTS

| | | | |
|---|---|---|---|
| 2,998,535 | 8/1961 | Church et al. ...................... | 310/325 X |
| 4,431,935 | 2/1984 | Rider ....................................... | 310/331 |
| 4,431,938 | 2/1984 | Inoue ....................................... | 310/348 |
| 4,503,350 | 3/1985 | Nakatani et al. ....................... | 310/321 |
| 5,325,012 | 6/1994 | Sato et al. ............................... | 310/364 |
| 5,635,786 | 6/1997 | Fujimoto ............................. | 310/332 X |

FOREIGN PATENT DOCUMENTS 0685704  5/1995  European Pat. Off. .

*Primary Examiner*—Mark O. Budd
*Attorney, Agent, or Firm*—Ostrolenk, Faber, Gerb & Soffen, LLP

[57] ABSTRACT

A vibrating gyro which includes a vibrator formed by joining two piezoelectric substrates, which are polarized in opposite directions, by a metal layer. Electrodes are formed on the main outer surfaces of the piezoelectric substrates. One of the electrode is split into six electrode portions. As the metal layer, a material having a melting point lower than the Curie point of the piezoelectric substrates is used. Cut portions are formed on the joining sides of the piezoelectric substrates, and high-temperature metal wires or the like are passed through the cut portions, thereby forming support members.

5 Claims, 13 Drawing Sheets

VIBRATING GYRO AND METHOD OF MANUFACTURING THE SAME

BACKGROUND OF THE INVENTION

1. Field of the Invention

The present invention relates to a vibrating gyro and a method of manufacturing the vibrating gyro, and more particularly, to a vibrating gyro, for example, used to prevent camera shake, or used in a car-navigation system, a pointing device and the like, and a method of manufacturing the vibrating gyro.

2. Description of the Related Art

FIG. 14 is a perspective view showing an example of conventional vibrating gyros. A vibrating gyro 1 includes a vibrator 2 which is formed by bonding a first piezoelectric substrate 3 and a second piezoelectric substrate 4. The first and second piezoelectric substrates 3 and 4 are bonded by a resin layer 5 made of, for example, epoxy resin, and polarized in opposite thickness directions as shown by the arrows.

A split electrode 6 is formed on the main outer surface of the first piezoelectric substrate 3. The electrode 6 is split in two in the widthwise direction of the first piezoelectric substrate 3 by a groove extending in the lengthwise direction, and furthermore, split in three in the lengthwise direction by two grooves extending in the widthwise direction near nodes of the vibrator 2. In other words, the electrode 6 is split into six. Furthermore, another electrode 7 is formed all over the main outer surface of the second piezoelectric substrate 4. Support members 8, which are formed of, for example, metal wires, are attached to the electrode 7 near the nodes of the vibrator 2 by solder, conductive paste or the like.

In this vibrating gyro 1, a drive signal is applied between two electrode portions 6a and 6b, which are located in the middle of the electrode 6 in the lengthwise direction, and the electrode 7 opposed thereto. Since the first and second piezoelectric substrates 3 and 4 are polarized in opposite directions, the vibrator 2 has a bimorph structure, and flexurally vibrates in the direction orthogonal to planes, where the electrodes 6 and 7 are formed, in response to the drive signal. At this time, the vibrator 2 flexurally vibrates about two nodes located a little inward from both ends in the lengthwise direction thereof. The identical signals are output from the electrode portions 6a and 6b at this time. The two signals are balanced and canceled to 0.

When the vibrator 2 rotates about the axis, a Coriolis force acts in the direction orthogonal to the flexural vibration of the vibrator 2. The direction of the flexural vibration of the vibrator 2 is changed thereby and output signals from the electrode portions 6a and 6b are also changed. In other words, when the output signal from one electrode portion 6a increases corresponding to the Coriolis force, the output signal from the other electrode portion 6b decreases corresponding to the Coriolis force. Therefore, only signals corresponding to the Coriolis force can be obtained by finding the difference between the output signals from these electrode portions 6a and 6b. Thus, the rotational angular velocity applied to the vibrating gyro 1 can be detected by measuring the difference between output signals from the electrode portions 6a and 6b.

However, epoxy resin used to join two piezoelectric substrates has a glass transition point. Above 80° C., epoxy resin starts to soften, the quality factor Q declines, and sensitivity of the vibrating gyro also declines. If a material having a high Curie point such as $LiNbO_3$ and $LiTaO_3$ is used as the material of the piezoelectric substrates, deterioration of the temperature characteristic at high temperature impairs high heat resistance of the material as an advantage. Although the quality factors Q of these materials are high, the quality factor Q of epoxy resin is low, which lowers the quality factor Q of the whole vibrator. Furthermore, since real nodes of the vibrator are positioned on the center axis thereof, if a support member is attached to the surface of the vibrator, leakage of vibration from the support member is inevitable. In addition, if the support member is attached to the electrode on the surface of the vibrator, support strength thereof cannot be made higher than the adhesive strength between the electrode and the piezoelectric substrate, whereby the support member is likely to fall out due to a shock, such as a dropping of the vibrator.

SUMMARY OF THE INVENTION

Accordingly, a main object of the present invention is to provide a vibrating gyro in which the quality factor Q of a vibrator is high and is not lowered within the practical temperature range. Another object of the present invention is to provide a vibrating gyro in which leakage of vibration from a support member is small and support strength is high. A further object of the present invention is to provide a method of manufacturing a vibrating gyro having the above-mentioned features.

The present invention provides a vibrating gyro comprising a vibrator having two piezoelectric substrates joined by a metal layer, and electrodes formed on main outer surfaces of the two piezoelectric substrates respectively, at least one of the electrodes being split, wherein the metal layer is made of a material having a melting point lower than the Curie point of the two piezoelectric substrates.

In this vibrating gyro, cut portions may be formed respectively on the sides of the two piezoelectric substrates near a node of the vibrator.

In order to support the vibrator, a support member is placed in the metal layer near the node of the vibrator.

This support member is formed by press-fitting a metal wire into the metal layer near the node of the vibrator.

The present invention provides a vibrating gyro manufacturing method comprising the steps of providing two piezoelectric substrates, obtaining a vibrator by joining the two piezoelectric substrates by a metal layer made of a metal material having a melting point lower than the Curie point of the two piezoelectric substrates, and forming a support member by press-fitting a metal wire heated to a high temperature into the metal layer near a node of the vibrator.

In this vibrating gyro manufacturing method, cut portions may be formed on the piezoelectric substrates respectively at the node of the vibrator before the two piezoelectric substrates are joined, and the high-temperature metal wire may be press-fitted into the metal layer at the cut portions.

The metal layer for joining the two piezoelectric substrates has a higher quality factor Q than epoxy resin, and does not soften within the practical temperature range of the vibrating gyro. Furthermore, when the cut portions are formed on the joining sides of the piezoelectric substrates respectively, metal melted in joining the piezoelectric substrates enters the cut portions and is prevented from flowing out of the joining sides of the piezoelectric surfaces. Still furthermore, when the metal wire heated to a high temperature is press-fitted into the cut portions after joining the piezoelectric substrates, the metal layer existing at the cut portions melts and the metal wire is inserted inside the vibrator. After that, the metal layer is solidified by cooling, and thereby, the metal wire is fixed by the metal layer and used as a support member. This support member is located near a real node of the vibrator. Although molten metal is used in joining the piezoelectric substrates, since the melting point thereof is lower than the Curie point of the piezoelectric substrates, polarization of the piezoelectric substrates is not removed.

According to the present invention, since the piezoelectric substrates are joined by a metal layer having a high quality factor Q, the quality factor Q of the whole vibrator is also kept high. In addition, since polarization is not removed in joining the piezoelectric substrates and the metal layer does not soften in the practical temperature range, the quality factor Q does not decline during operation of the vibrating gyro, which achieves a highly sensitive vibrating gyro. Furthermore, the joining metal is prevented from adhering to the surface of the vibrator by forming cut portions on the joining sides of the piezoelectric substrates, and the deterioration of the characteristics can be thereby restricted. Still furthermore, joint strength between the support member and the vibrator can be increased by fixing the support member by the metal layer. Therefore, even if a great shock is applied due to the falling of the vibrating gyro, the support member can be prevented from falling out of the vibrator. Still furthermore, since the support member can be supported at a position closer to the real node on the center axis of the vibrator than the case in which the support member is attached to the surface of the vibrator, vibration leakage from the support member is decreased, and a vibrating gyro having good characteristics is achieved.

The above and other objects, features and advantages will become more apparent from the following detailed description of the embodiments of the present invention with reference to the drawings.

DESCRIPTION OF THE PREFERRED EMBODIMENTS

Figure 1:
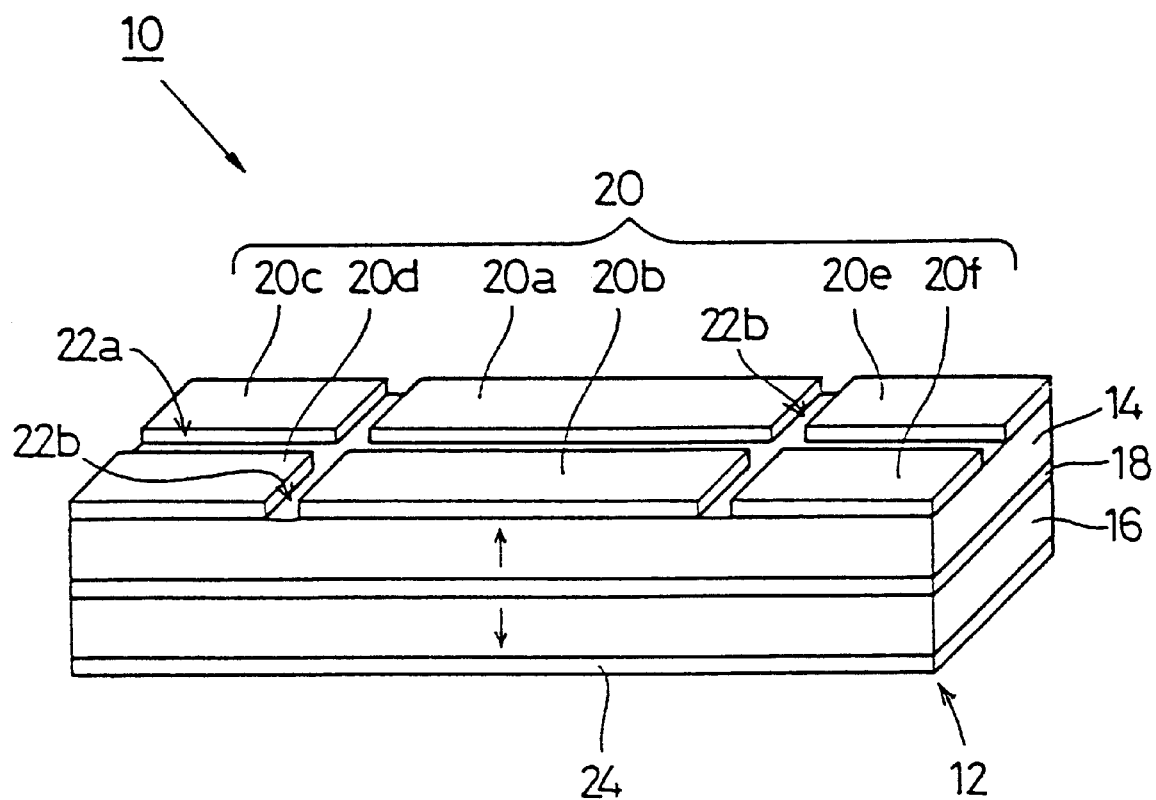
FIG. 1 is a perspective view of a vibrating gyro according to an embodiment of the present invention.

FIG. 1 is a perspective view showing a vibrating gyro according to an embodiment of the present invention. A vibrating gyro 10 includes a vibrator 12 having a first piezoelectric substrate 14 and a second piezoelectric substrate 16. As the first and second piezoelectric substrates 14 and 16, for example, piezoelectric ceramic, single crystal such as $LiNbO_3$ and $LiTaO_3$, and the like are used. The first and second piezoelectric substrates 14 and 16 are joined by a metal layer 18. At this time, the first and second piezoelectric substrates 14 and 16 are polarized in opposite thickness directions as shown by the arrows in FIG. 1. Therefore, the vibrator 12 has a bimorph structure. As the metal layer 18, a metal material having a melting point lower than the Curie point of the first and second piezoelectric substrates 14 and 16 is used. Although solder or the like is used as such a material, a Bi material, an In material, Ag solder and the like may be used besides.

A first electrode 20 is formed on the main outer surface of the first piezoelectric substrate 14. On the first electrode 20, a groove 22a extending in the lengthwise direction of the first piezoelectric substrate 14 and two grooves 22b extending in the widthwise direction thereof are formed. The grooves 22b are formed at positions corresponding to nodes for flexural vibration of the vibrator 12, that is, at positions a little inward from both ends of the first piezoelectric substrate 14 in the lengthwise direction. The first electrode 20 is split into six electrode portions 20a, 20b, 20c, 20d, 20e and 20f by these grooves 22a and 22b. Furthermore, a second electrode 24 is formed all over the main outer surface of the second piezoelectric substrate 16.

Figure 2:
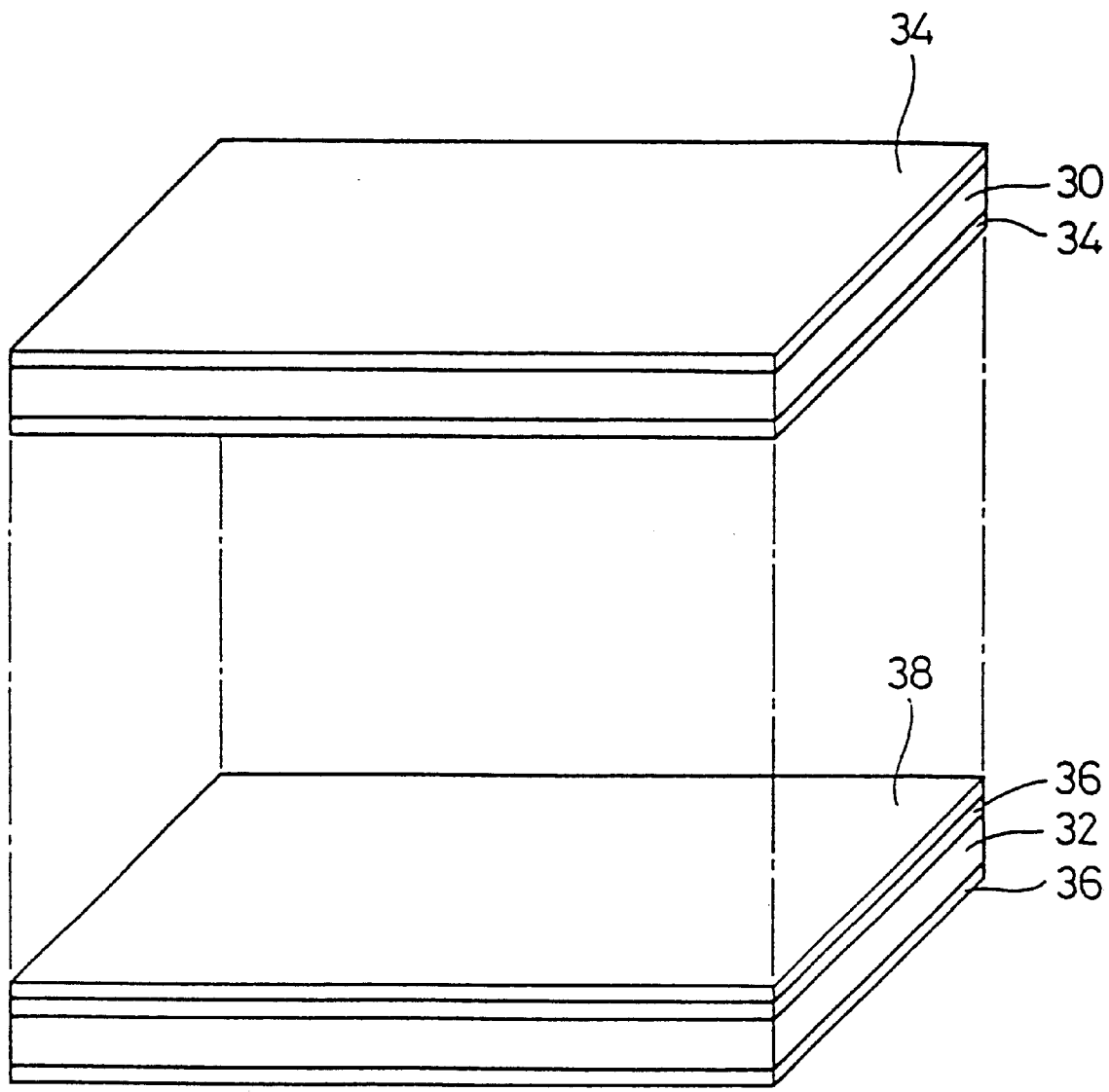
FIG. 2 is a perspective view of piezoelectric substrates prepared to manufacture the vibrating gyro shown in FIG. 1.
Figure 3:
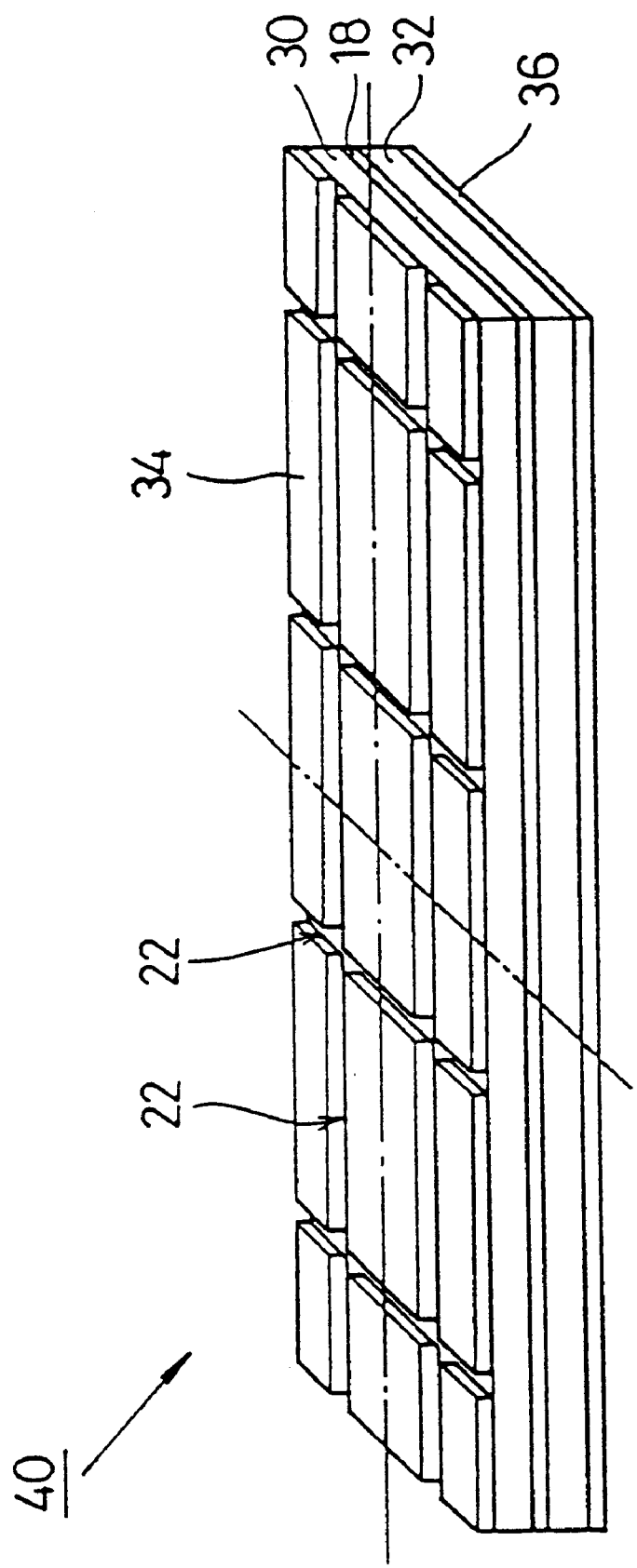
FIG. 3 is a perspective view showing a state in which the piezoelectric substrates shown in FIG. 2 are laminated.

In order to manufacture such a vibrating gyro 10, as shown in FIG. 2, two large piezoelectric substrates 30 and 32 are prepared. Electrodes 34 and 36 are respectively formed on both sides of the piezoelectric substrates 30 and 32, respectively. Solder cream 38 is printed on one main surface of each of the piezoelectric substrates 30 and 32. The solder cream 38 is melted by heating, and then cooled, whereby solder layers are formed on the piezoelectric substrates 30 and 32 respectively. After the piezoelectric substrates 30 and 32 are laminated so as to bring the solder layers thereof into close contact with each other, the solder layers are melted by heating again, and the two piezoelectric substrates 30 and 32 are rubbed together and contact-bonded. By cooling the contact-bonded piezoelectric substrates 30 and 32, as shown in FIG. 3, a large multilayer substrate 40 joined by the metal layer 18 is obtained. Grooves 22 are formed at predetermined intervals on the multilayer substrate 40 in order to form the grooves 22a and 22b of the vibrating gyro 10. After that, the multilayer substrate 40 is cut by dicing or the like as shown by the alternate long and short dashed line in FIG. 3, thereby making the vibrating gyro 10 shown in FIG. 1. In the process of manufacturing the vibrating gyro 10, since a solder having a melting point lower than the Curie point of the piezoelectric substrates 30 and 32 is used as solder for forming the metal layer 18, polarization of the piezoelectric substrates 30 and 32 is not removed.

Figure 4:
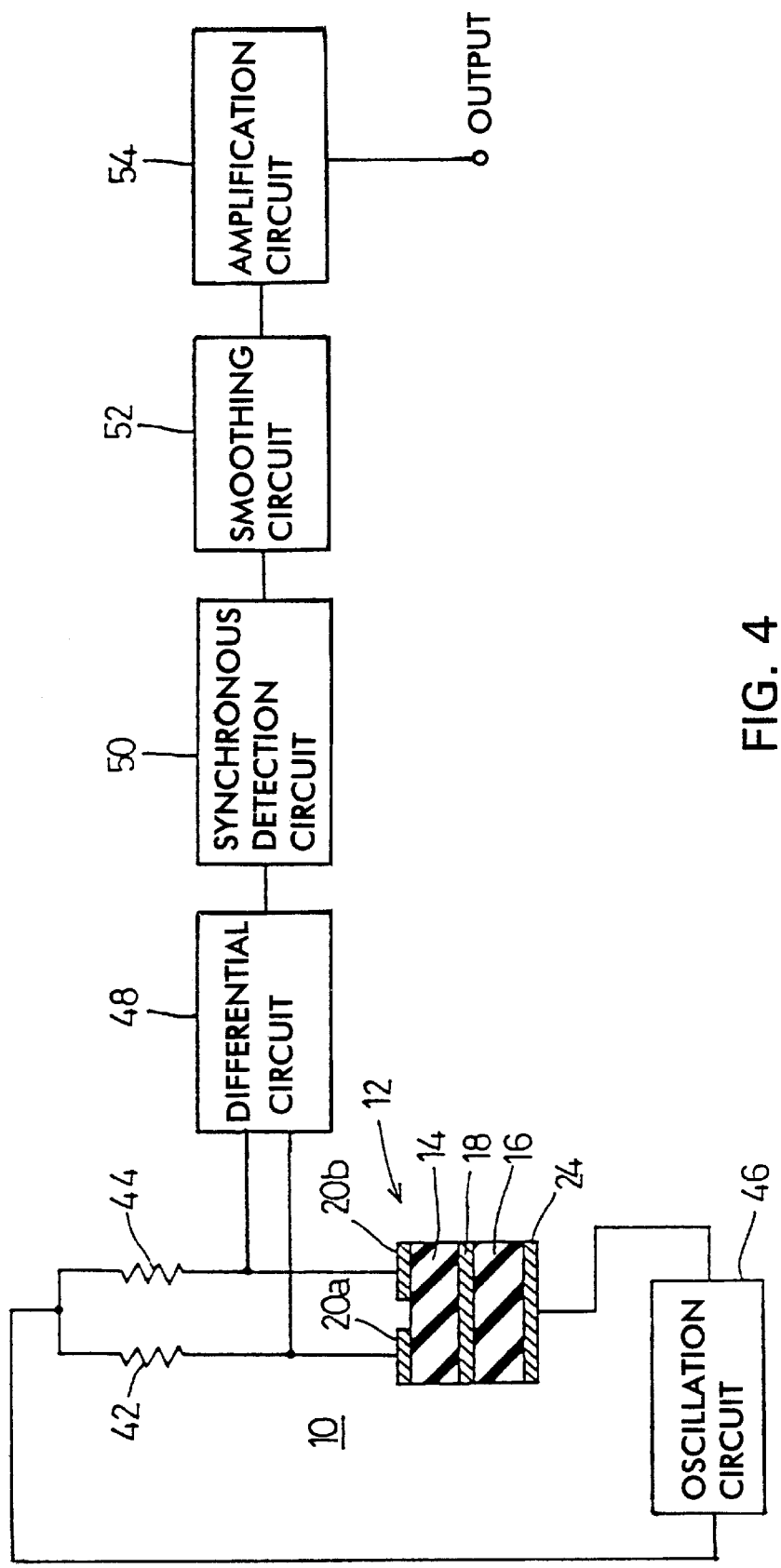
FIG. 4 is a block diagram of circuits used during operation of the vibrating gyro shown in FIG. 1.

In using this vibrating gyro 10, resistors 42 and 44 are connected to the two electrode portions 20a and 20b in the middle of the first electrode 20 in the lengthwise direction as shown in FIG. 4. An oscillation circuit 46 is connected between these resistors 42 and 44 and the second electrode 24. The oscillation circuit 46 includes, for example, an amplification circuit and a phase correction circuit, and a signal output from the second electrode 24 is fed back to the oscillation circuit 46. Then, the level and phase of the feedback signal are adjusted by the amplification circuit and the phase correction circuit, and the corrected signal is given to the electrode portions 20a and 20b of the first electrode 20.

The electrode portions 20a and 20b of the first electrode 20 are also connected to an input terminal of a differential circuit 48. An output terminal of the differential circuit 48 is connected to a synchronous detection circuit 50. In the synchronous detection circuit 50, an output signal of the differential circuit 48 is detected in synchronization with, for example, a signal of the oscillation circuit 46. The synchronous detection circuit 50 is connected to a smoothing circuit 52, and furthermore, the smoothing circuit 52 is connected to an amplification circuit 54.

This vibrating gyro 10 is self-driven by the oscillation circuit 46. Since the vibrator 12 has a bimorph structure, when the first piezoelectric substrate 14 expands in the direction parallel with the main surface thereof, the second piezoelectric substrate 16 contracts in the direction parallel with the main surface thereof. On the contrary, when the first piezoelectric substrate 14 contracts in the direction parallel with the main surface thereof, the second piezoelectric substrate 16 expands in the direction parallel with the main surface thereof. Therefore, the vibrator 12 flexurally vibrates in the direction orthogonal to the planes where the first and second electrodes 20 and 24 are formed.

When no rotational angular velocity is applied, the identical signals are output from the electrode portions 20a and 20b, and canceled by the differential circuit 48. Therefore, no signal is output from the differential circuit 48. When the vibrator 12 is rotated about the axis, a Coriolis force acts in the direction orthogonal to the direction of flexural vibration. The direction of flexural vibration of the vibrator 12 is changed by this Coriolis force. Thereby, signals output from the electrode portions 20a and 20b are changed. For example, when the signal output from the electrode portion 20a increases, the signal output from the electrode portion 20b decreases. Therefore, the difference between the output signals of the electrode portions 20a and 20b is obtained by the differential circuit 48. The change in output signals of the electrode portions 20a and 20b corresponds to the change in direction of flexural vibration of the vibrator 12, that is, the Coriolis force. Therefore, a signal at the level corresponding to the Coriolis force is output from the differential circuit 48.

The output signal of the differential circuit 48 is detected by the synchronous detection circuit 50 in synchronization with the signal of the oscillation circuit 46. At this time, only a positive portion or a negative portion of the output signal is detected. The signal detected by the synchronous detection circuit 50 is smoothed by the smoothing circuit 52, and amplified by the amplification circuit 54. Therefore, the rotational angular speed applied to the vibrating gyro 10 can be detected by measuring the output signal of the amplification circuit 54.

When the direction of the rotational angular velocity is reversed, the change in direction of flexural vibration of the vibrator 12 is reversed, and the change in output signals of the electrode portions 20a and 20b is also reversed. The phase of a signal output from the differential circuit 48 is thereby reversed, and the polarity of a signal detected by the synchronous detection circuit 50 is also reversed. The polarity of an output signal from the amplification circuit 54 is also reversed. Therefore, the direction of the rotational angular velocity can be detected based on the polarity of the output signal of the amplification circuit 54.

In this vibrating gyro 10, the metal layer 18 made of solder or the like is used to join the first and second piezoelectric substrates 14 and 16. The metal layer 18 has a higher quality factor Q than the conventional epoxy resin layer. Therefore, the quality factor Q of the whole vibrator 12 is high, which makes the vibrating gyro 10 highly sensitive. Although epoxy resin has a softening point near 80° C., since the metal layer 18 does not soften within the practical temperature range between −40° C. and 80° C., the first and second piezoelectric substrates 14 and 16 do not slip off from each other due to change in temperature, and decline in sensitivity of the vibrating gyro 10 can be restricted.

Figure 5:
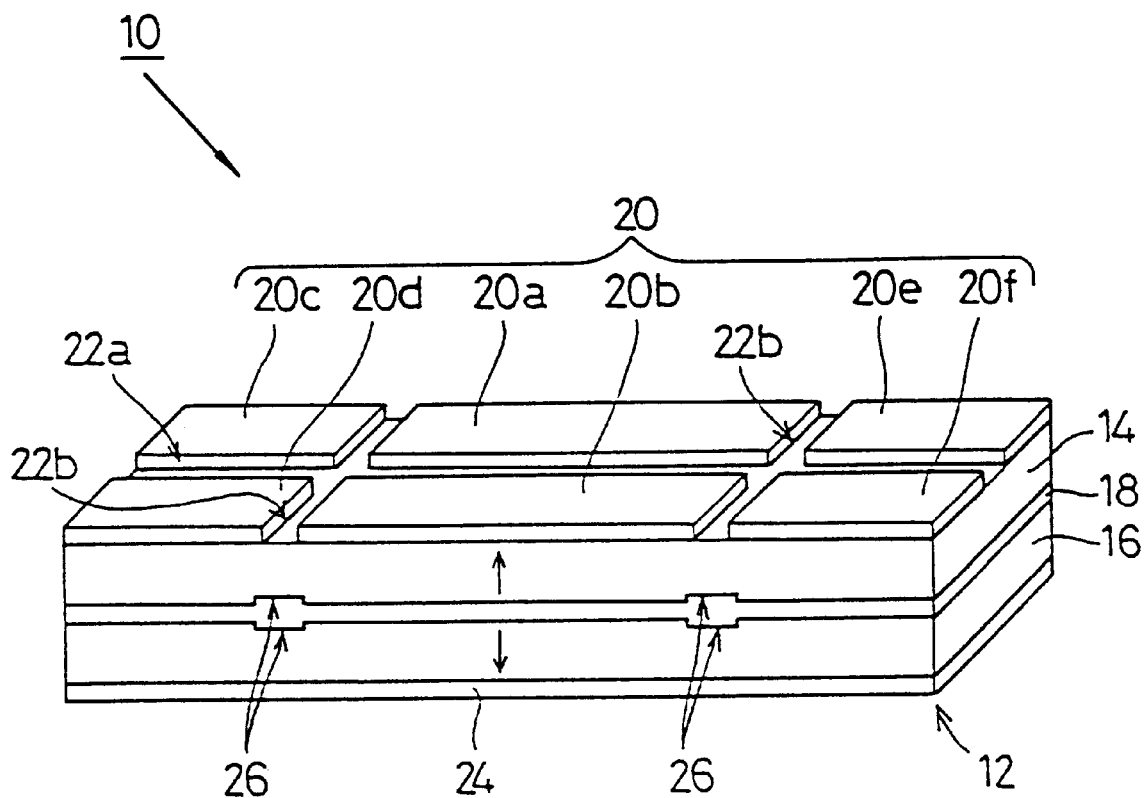
FIG. 5 is a perspective view of a vibrating gyro according to another embodiment of the present invention.

As shown in FIG. 5, cut portions 26 may be formed on the joining sides of the first and second piezoelectric substrates 14 and 16, respectively. The cut portions 26 are formed at positions corresponding to two nodes of the vibrator 12, and each shaped like a groove extending in the widthwise direction of the first and second piezoelectric substrates 14 and 16.

Figure 6:
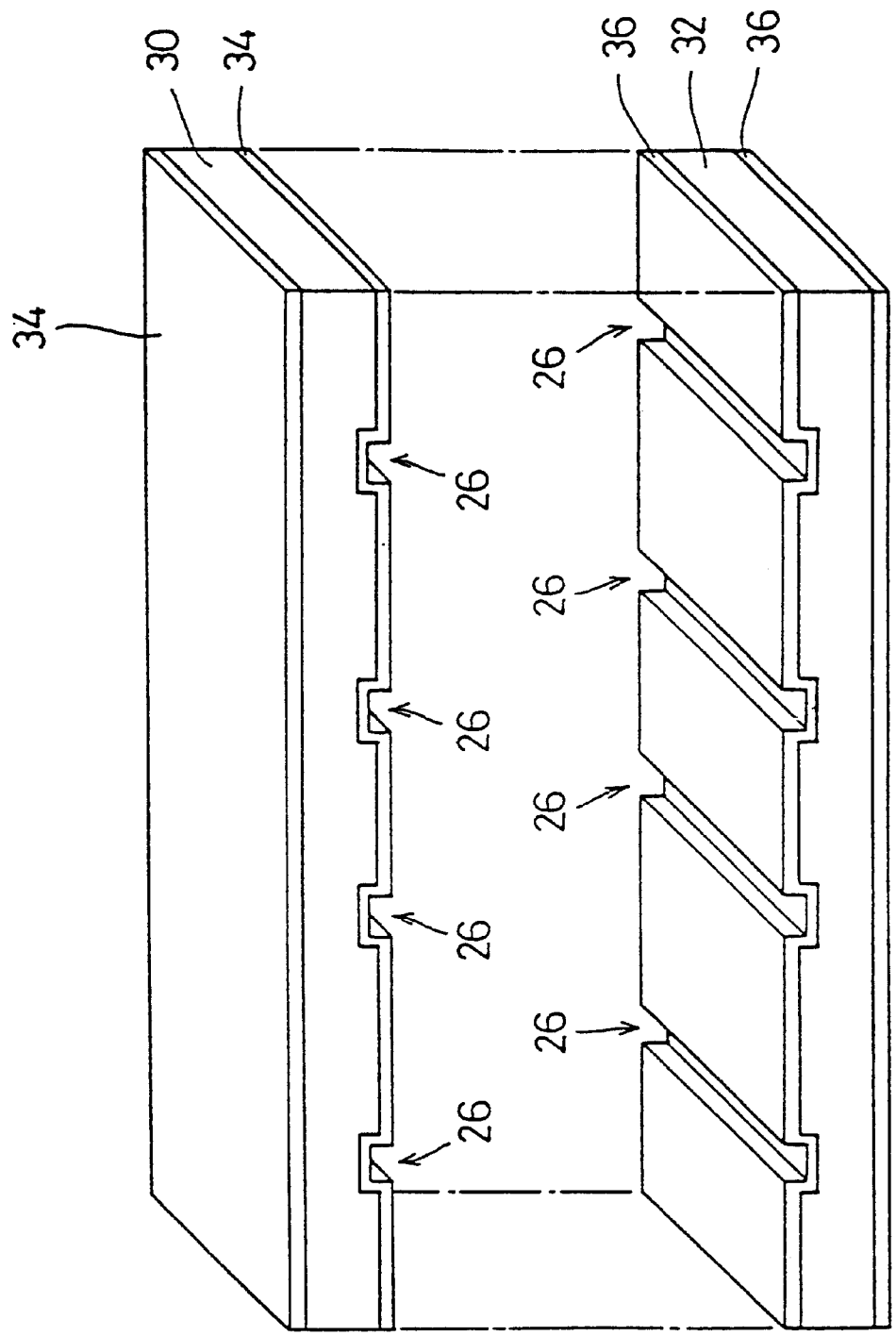
FIG. 6 is a perspective view of piezoelectric substrates prepared to manufacture the vibrating gyro shown in FIG. 5.
Figure 7:
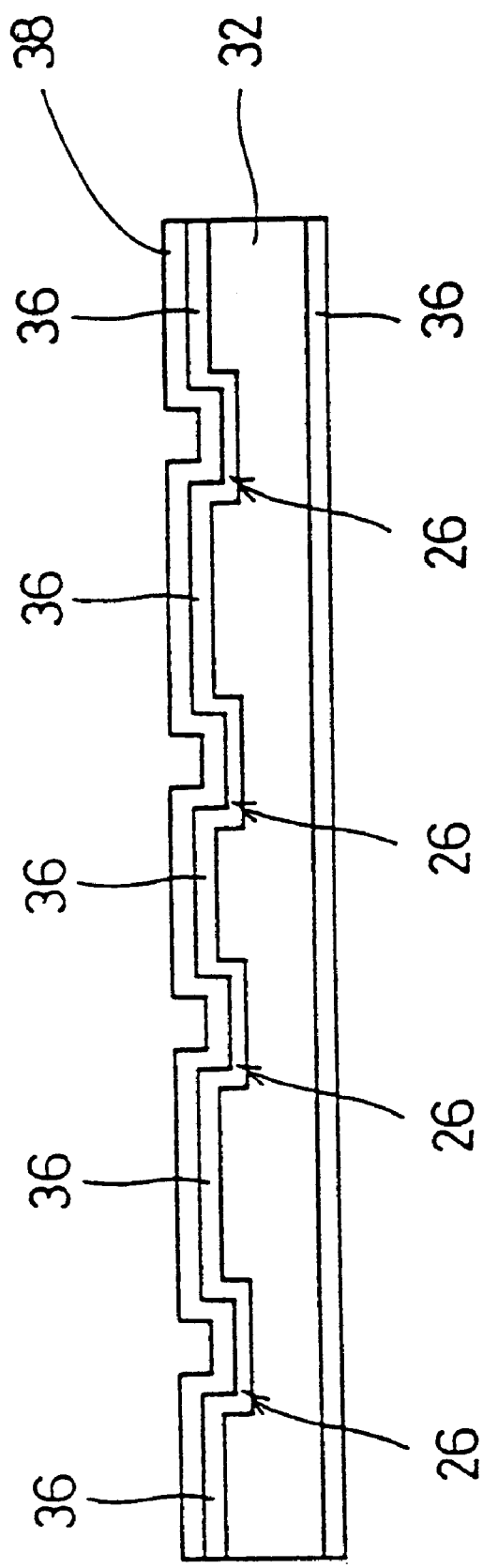
FIG. 7 is an illustration showing a state in which solder cream is applied onto the piezoelectric substrate shown in FIG. 6.

In order to manufacture such a vibrating gyro 10, as shown in FIG. 6, large piezoelectric substrates 30 and 32 are prepared. The cut portions 26 are formed on the joining sides of the piezoelectric substrates 30 and 32. Electrodes 34 and 36 are formed on both sides of the piezoelectric substrates 30 and 32, respectively. As shown in FIG. 7, solder cream 38 is printed on the joining sides of the piezoelectric substrates 30 and 32, melted by heating and then cooled, thereby forming solder layers on the piezoelectric substrates 30 and 32, respectively.

Figure 8:
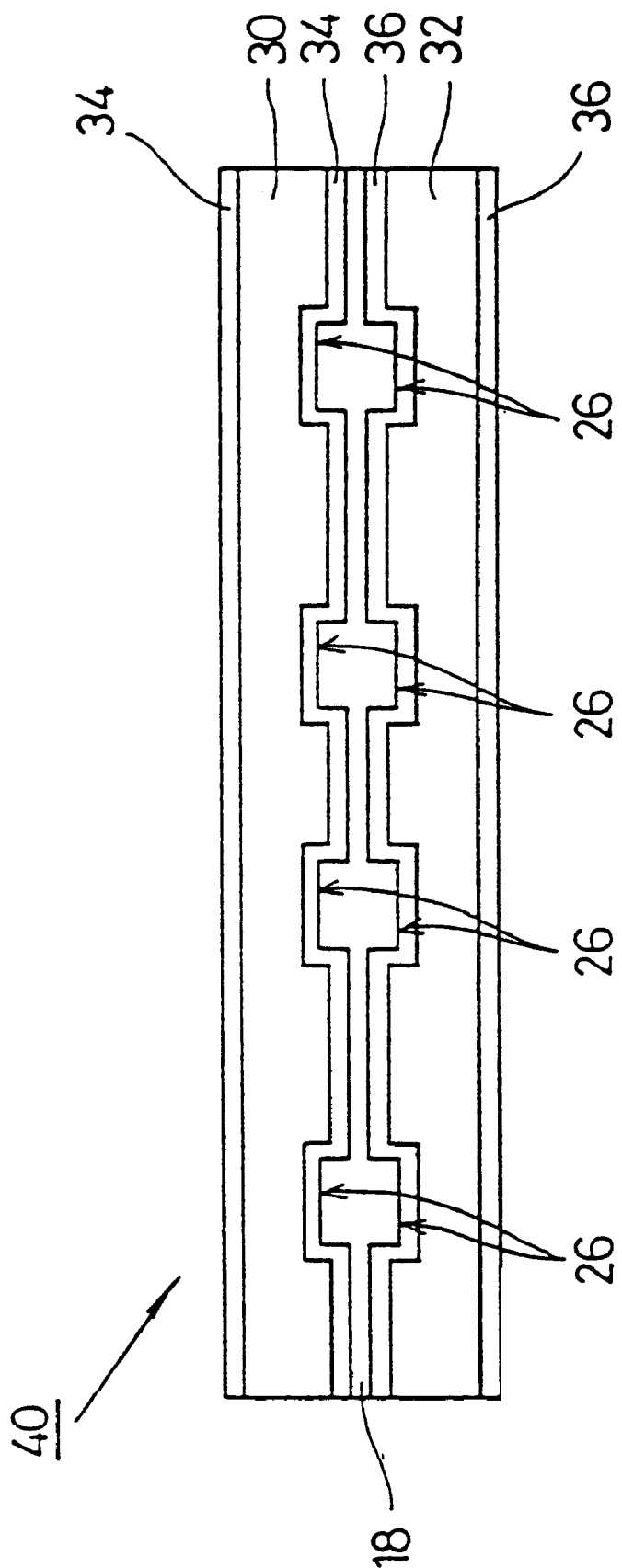
FIG. 8 is an illustration showing a state in which the two piezoelectric substrates are contact-bonded.

Next, as shown in FIG. 8, the piezoelectric substrates 30 and 32 are so laminated as to bring the solder layers thereof into close contact with each other, and contact-bonded by heating. At this time, although the piezoelectric substrates 30 and 32 are rubbed together, overflowing molten solder is collected in the cut portions 26, and prevented from flowing out of the piezoelectric substrates 30 and 32. After the contact-bonded piezoelectric substrates 30 and 32 are cooled, grooves 22 are formed on the electrode 34 of the piezoelectric substrate 30, and the laminated substrates 30 and 32 are cut by dicing or the like, whereby the vibrating gyro 10 shown in FIG. 5 is manufactured. Since solder is prevented by the cut portions 26 from adhering to the outside of the vibrator 12, the characteristics of the vibrating gyro 10 can be kept good.

Figure 9:
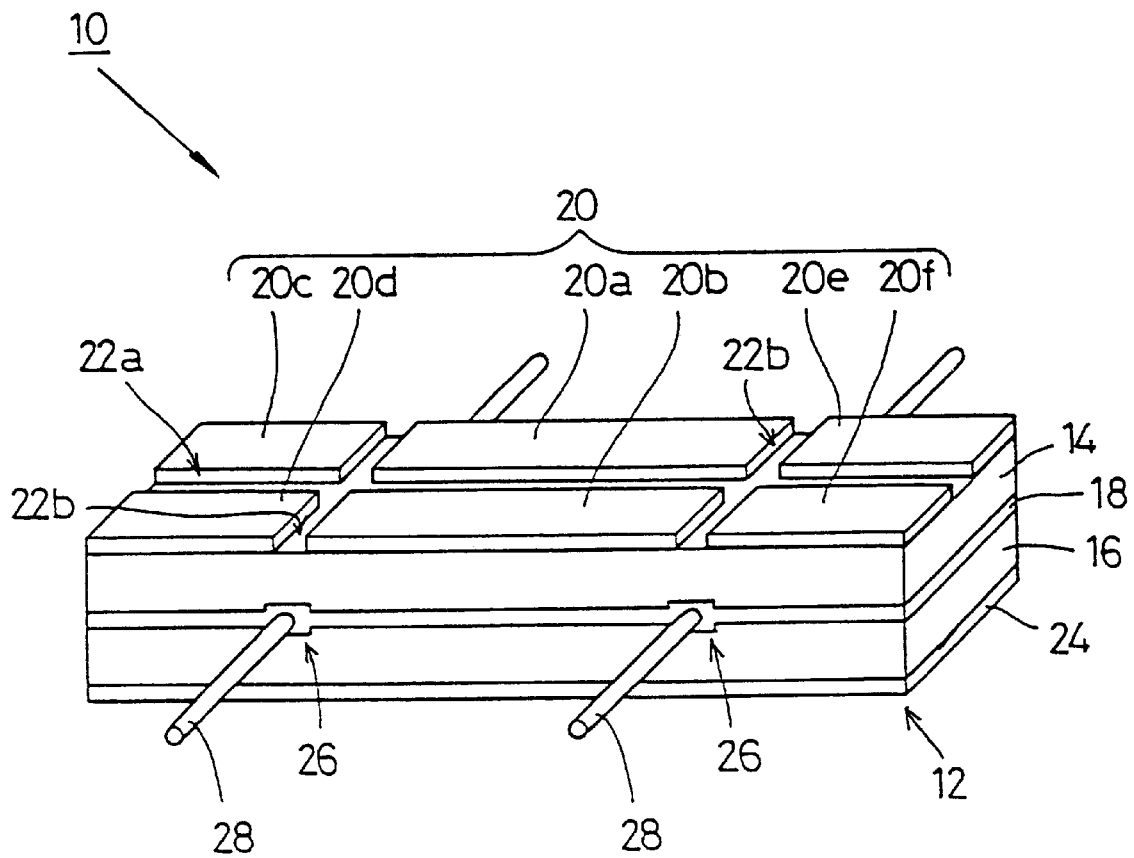
FIG. 9 is a perspective view showing a further embodiment in which support members are mounted on the vibrating gyro shown in FIG. 5.
Figure 10:
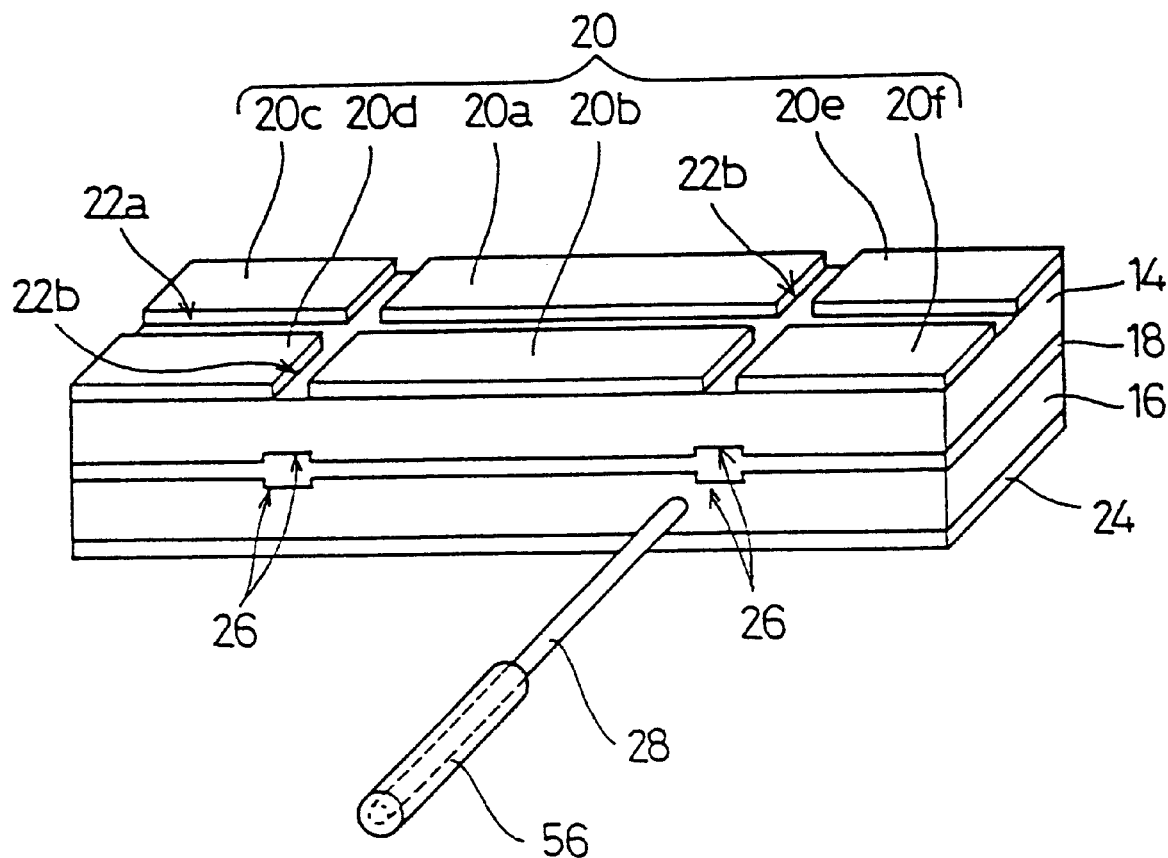
FIG. 10 is a perspective view showing a state in which the vibrating gyro shown in FIG. 9 is manufactured.

In this vibrating gyro 10, as shown in FIG. 9, support members 28 can be mounted in the cut portions 26. These support members 28 are formed of, for example, metal wires. In mounting, the support member 28 is held by a heat supplier 56 as shown in FIG. 10, and kept at a high temperature. By sticking the support member 28 into the metal layer 18 at the cut portions 26, the metal layer 18 is melted and the support member 28 is penetrated. Then, the melted metal layer 28 is solidified by cooling, and the support member 28 is thereby fixed. The support member 28 may be coated with flux in a state where the temperature thereof is kept high, and stuck into the metal layer 18 at the cut portions 26.

In this vibrating gyro 10, since the support members 28 are penetrated through the vibrator 12 and fixed by the metal layer 18, fixing strength can be made higher than the conventional vibrating gyro in which support members are soldered on the vibrator surface. Therefore, even if the vibrating gyro 10 is shocked by falling, the support members 28 are prevented from coming off.

Figure 11:
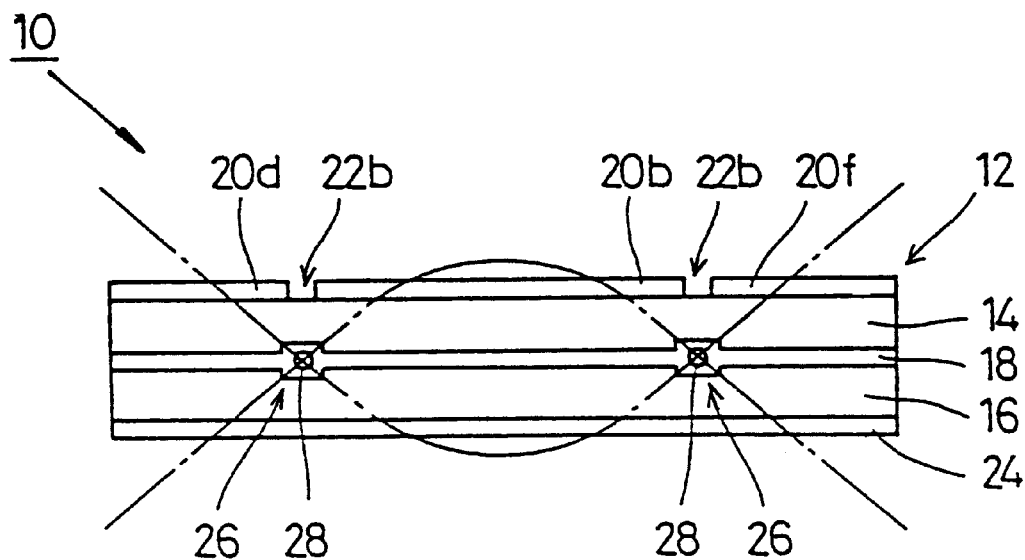
FIG. 11 is an illustration showing a state in which the vibrating gyro shown in FIG. 9 flexurally vibrates.
Figure 12:
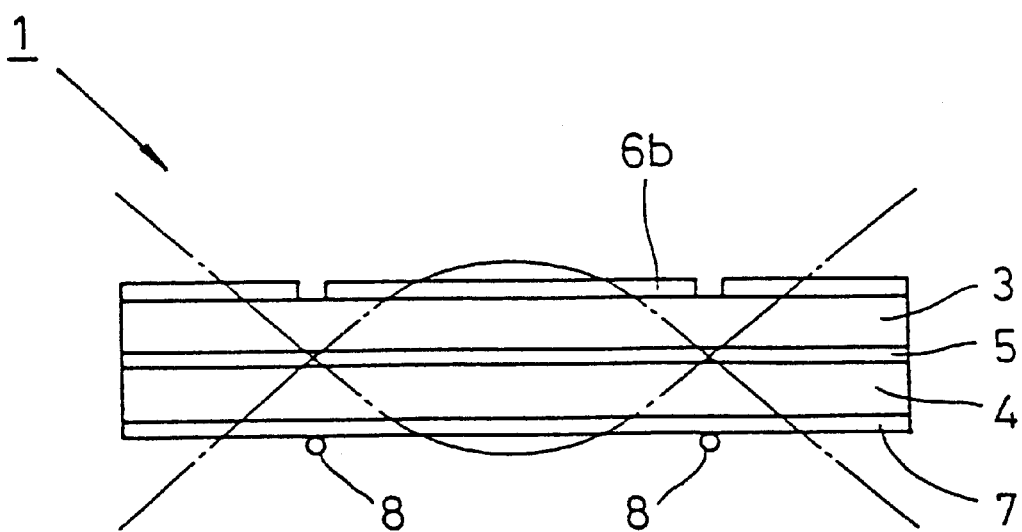
FIG. 12 is an illustration showing a state of flexural vibration of a conventional vibrating gyro for comparison with FIG. 11.

Furthermore, since the support members 28 penetrate through real nodes of the vibrator 12 in this vibrating gyro 10, as shown in FIG. 11, the vibrator 12 can be made to flexural vibrate about the support members 28. Contrarily, in the conventional vibrating gyro in which the support members are mounted on the vibrator surface, as shown in FIG. 12, the nodes about which the flexural vibration is made are deviated from the support members. Accordingly, in the vibrating gyro 10 of the present invention, vibration leakage from the support member 28 is small and stable characteristics are obtained compared with the conventional vibrating gyro.

Figure 13:
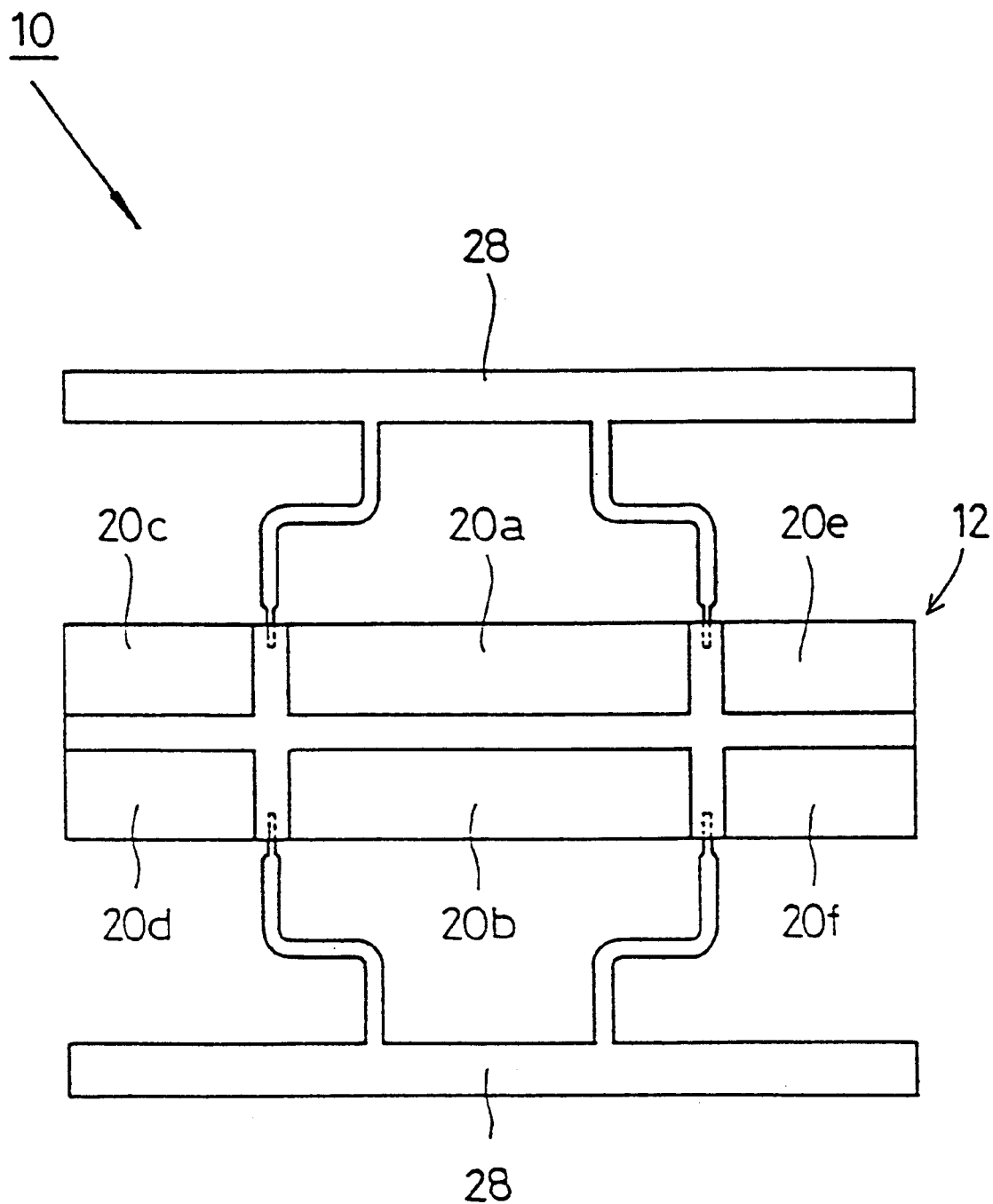
FIG. 13 is an illustration showing a variation of the vibrating gyro shown in FIG. 9.
Figure 14:
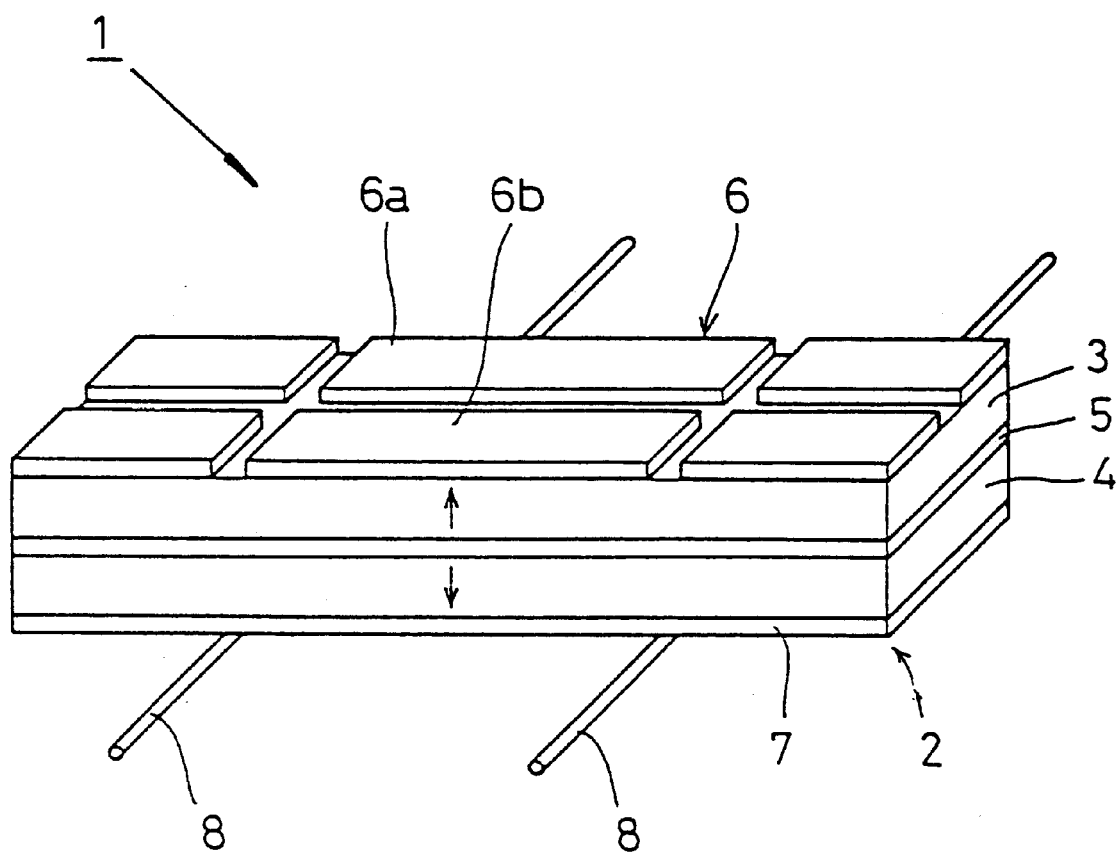
FIG. 14 is a perspective view showing an example of conventional vibrating gyros.

As the support members 28, plate-like support members may be used as shown in FIG. 13. In this embodiment, plates are stamped out so that the leading ends thereof narrow, and the leading ends are inserted into the cut portions 26 of the vibrator 12. In this case, the metal layer 18 is also melted and the leading ends of the support members 28 are inserted inside the vibrator 12 by heating and pressing the support members against the cut portions 26. Then, the melted metal is solidified by cooling, and the support members 28 are fixed by the metal layer 18. Although the support members 28 do not penetrate in this vibrating gyro 10, since the support members 28 is inserted inside the vibrator 12 and fixed by the metal layer 18, the same advantages as those of the vibrating gyro 10 shown in FIG. 9 can be obtained. Furthermore, the cut portions 26 may be shaped like not only a square, but also the letter V, a gutter or the like.

Although the first electrode 20 is only split in the above vibrating gyro 10, the second electrode 24 may be similarly split. Even in such electrode structure, the vibrator 12 can be made to flexural vibrate by applying a drive signal between the two electrodes 20 and 24. In this case, the signal corresponding to the rotational angular velocity may be taken out of split portions of the first electrode 20 or split portions of the second electrode 24.

Furthermore, the two piezoelectric substrates 14 and 16 may be polarized in the same direction. In this case, for example, the metal layer 18 is used as a common electrode, and an output signal from the metal layer 18 is fed back to the oscillation circuit 46. By applying a signal from the oscillation circuit 46 to the first electrode 20 and the second electrode 24, the vibrator 12 can be made to flexurally vibrate. Such a structure increases the shift per unit voltage, and further enhances sensitivity. In other words, it is possible to obtain sufficient sensitivity at low voltage, and to thereby obtain a power-saving gyro. In addition, it is possible to use the support members 28, which are mounted in the metal layer 18 serving as the common electrode, as lead wires, and to thereby simplify the lead wiring process.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A vibrating gyro comprising;
   a vibrator having two piezoelectric substrates joined by a metal layer, said metal layer being made of a material having a melting point lower from the Curie point of either of said two piezoelectric substrates;
   electrodes formed on main outer surfaces of said two piezoelectric substrates respectively, at least one of said electrodes being split;
   at least a first support member placed in said metal layer near a node of said vibrator in order to support said vibrator; and
   said piezoelectric substrates having at least first cut portions on first sides of said two piezoelectric substrates near a node of said vibrator, said support member extending through said first cut portions and into said metal layer.

2. A vibrating gyro according to claim 1, wherein said support member is a metal wire press-fitted into said metal layer near the node of said vibrator.

3. A vibrating gyro according to claim 1, wherein said at least one piezoelectric substrate is split by a first groove formed along a longitudinal axis.

4. A vibrating gyro according to claim 3, wherein said at least one piezoelectric substrate is further split by a least a second groove extending transversely of and intersecting said first groove.

5. A vibrating gyro according to claim 1, further including a second support, said piezoelectric substrates having second cut portions on second sides of said piezoelectric substrates opposite said first sides and near said node of said vibrator, said second support member extending through said second cut portions and into said metal layer.

* * * * *